United States Patent
Herrmann

(10) Patent No.: US 10,427,605 B2
(45) Date of Patent: Oct. 1, 2019

(54) MOVEABLE REAR VIEW MIRROR COMPRISING ACTIVE MATERIAL

(71) Applicant: SMR Patents S.à.r.l., Luxembourg (LU)

(72) Inventor: Andreas Herrmann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 135 days.

(21) Appl. No.: 15/377,296

(22) Filed: Dec. 13, 2016

(65) Prior Publication Data
US 2017/0174135 A1    Jun. 22, 2017

(30) Foreign Application Priority Data
Dec. 21, 2015  (EP) .................... 15201735

(51) Int. Cl.
*B60R 1/04*    (2006.01)
*B60R 1/08*    (2006.01)

(52) U.S. Cl.
CPC ............ *B60R 1/04* (2013.01); *B60R 1/086* (2013.01); *B60R 1/087* (2013.01)

(58) Field of Classification Search
CPC .......... G02B 5/08; G02B 7/182; G02B 7/198; G02B 17/00; B60R 1/04; B60R 1/072; B60R 1/08; B60R 1/083; B60R 1/088; B60R 1/086; B60R 1/087
USPC ............ 359/604, 603, 838, 841, 871, 872; 248/476, 474, 481
See application file for complete search history.

(56) References Cited

U.S. PATENT DOCUMENTS

| | | | | |
|---|---|---|---|---|
| 4,571,027 A | * | 2/1986 | Klein | B60R 1/087 250/215 |
| 4,940,322 A | * | 7/1990 | Hamamoto | B60R 1/07 307/10.1 |
| 6,164,784 A | * | 12/2000 | Butera | B60R 1/087 359/603 |
| 7,258,455 B2 | | 8/2007 | Weimer et al. | |
| 9,630,560 B2 | | 4/2017 | Alacqua et al. | |

FOREIGN PATENT DOCUMENTS

EP    1013503 A1    6/2000
JP    S626847 A     1/1987

OTHER PUBLICATIONS

Extended European Search Report, Application No. EP 15201735.6 dated May 31, 2016.
European Dispatch of a communication from the examining division, dated Aug. 25, 2017 and Applicant's reply dated Oct. 30, 2017.

* cited by examiner

*Primary Examiner* — Jie Lei
(74) *Attorney, Agent, or Firm* — MacMillan, Sobanski & Todd, LLC

(57) ABSTRACT

A rear view mirror for use in a motor vehicle includes a support element having a reflective element attached to a first side; and a frame element detachably attached to a second side of the support element which is located opposite the first side. The frame element includes an adjusting element that is adapted to connect the rear view mirror to a stationary support arm holding the rear view minor. The frame element is adapted to move the rear view minor relative to the stationary support arm and comprises active material to move the rear view mirror.

16 Claims, 4 Drawing Sheets

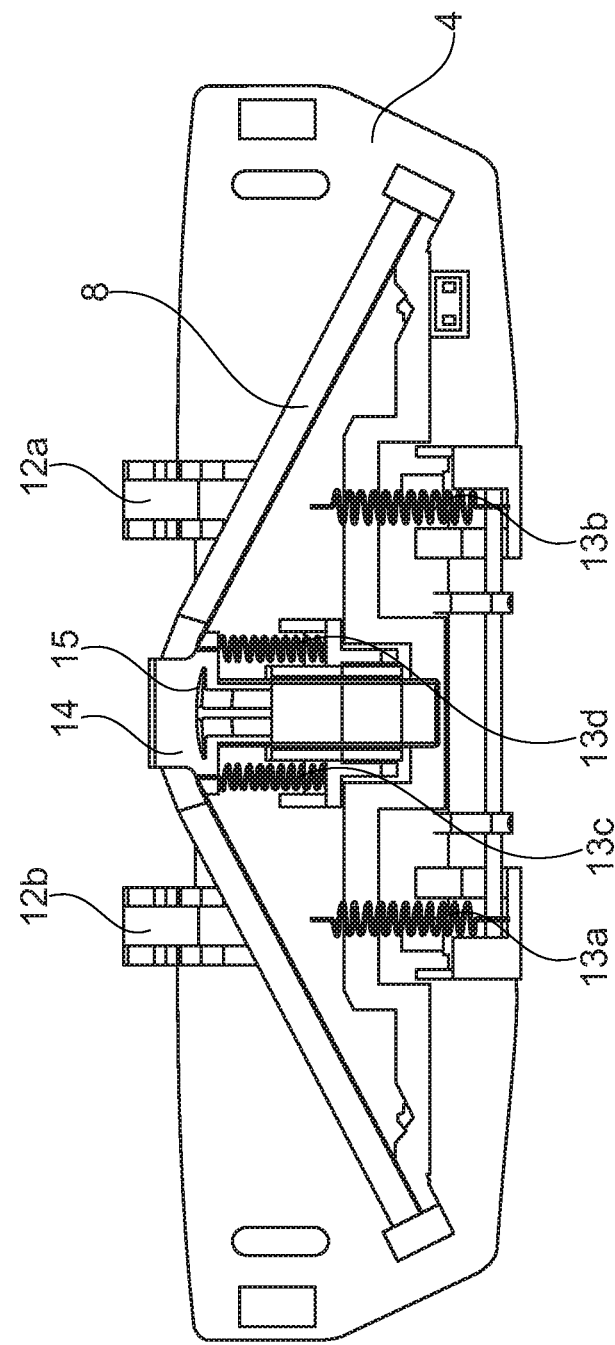

MOVEABLE REAR VIEW MIRROR COMPRISING ACTIVE MATERIAL

CROSS-REFERENCE TO RELATED APPLICATIONS

This application claims priority from European Patent Application No. 15201735.6, filed Dec. 21, 2015; the disclosure of which is incorporated herein by reference in its entirety.

BACKGROUND OF THE INVENTION

This invention relates in general to a rear view mirror, and in particular to an internal rear view mirror, for use in a motor vehicle. The rear view mirror is movable relative to a stationary support arm between a normal position and an anti-glare position by means of an active material.

Internal rear view minors are usually swivel mounted on the top of a vehicle's windshield to allow the driver to adjust the minor to optimize a rearward view through the vehicles rear window. Conventional internal rear view mirrors comprise a lever or tab which allows for mechanical movement of the reflective element of the rear view mirror from a normal position into an anti-glare position. In the anti-glare position, glare from a following vehicle's headlamps is reduced by tilting the surface of the reflective element out of line with the driver's view.

Most modem day internal rear view minors autonomously and automatically move the reflective element into the anti-glare position when light is detected that might otherwise blind the driver. For example, such a detection can be realized by means of photo sensors that are arranged on the casing of the rear view minor, or which are being arranged on the rear window itself. In the prior art rear view minors are known that use various components for moving the reflective element. For example, EP 1 593 550 A1 describes a rear view minor where the mirror casing is mounted on the windshield minor and that comprises an adjustment mechanism to adjust the reflective element while the remaining components of the rear view mirror remain stationary. For moving the reflective element, a driving mechanism using mechanical gears is employed.

However, these automatically adjustable rear view mirrors use many mechanical parts and are therefore rather bulky. Also, adjusting the reflective element by means of mechanical gears causes noises which may distract the driver.

Therefore, the invention aims at providing an improved rear view minor that allows to automatically adjust the reflective element, which comprises less parts, which can be mounted in a slim housing, and which does not cause noise when the reflective element is moved.

SUMMARY OF THE INVENTION

This invention provides a rear view minor, in particular an internal rear view minor, for use in a motor vehicle, in particular a car, comprising a support element having a reflective element attached to a first side. The rear view minor further comprises a frame element detachably attached to a second side of the support element which is located opposite the first side, wherein the frame element comprises an adjusting element, wherein the adjusting element is adapted to connect the rear view minor to a stationary support arm holding the rear view minor and to move the rear view minor relative to the stationary support arm, and wherein the frame element comprises active material to move the rear view minor.

The support element can be made of plastic material and can have essentially a flat and elongated shape so that a reflective element can be attached to a first side of the support element. The reflective element could be, for example, a prior art glass minor that is used in known rear view minor assemblies, or could consist of some reflective plastic material. The reflective element could be attached to the first side of the support element by means of an adhesive or by a mechanical connection using clamps or brackets to firmly connect both components.

The rear view minor further comprises a frame element that can be detachably attached to a second side of the support element which is located opposite the first side. The frame element could have a base that is essentially flat and which is detachably attached to the support element so that the frame element and the support element which carries the reflective element are firmly joined together. Here, the term "firmly joined together" is used to define that both elements are connected in such a manner that these components can move together. Also, the term "second side" is used to refer to the opposite side of the support element to which the reflective element is mounted.

Also, the frame element comprises the adjusting element, wherein the adjusting element is adapted to connect the rear view mirror to a stationary support arm holding the rear view mirror and to move the rear view mirror relative to a stationary support arm holding the rear view mirror. Here, the frame element as well as all components that are attached to the frame element can move relative the stationary support arm by means of the adjusting element. The adjusting element could have the shape of a flap that is suspendedly attached with one of its edges to the frame element and which comprises a corresponding geometry to connect to the stationary support arm. The movement can be a rotation or tilting.

The stationary support arm could be a prior art support arm which is conFigured to hold the rear view mirror by means of a suitable connection. For example, the rear view mirror could be held by a ball joint structure. The term "move relative to" is used to define that the rear view mirror can move from a normal position into an anti-glare position and back again. However, the term "move relative to" can be also used to refer to any movement of the rear view mirror that could take place in two planes at the same time.

The frame element also comprises active material to move the rear view mirror. Advantageously, active material has the property to change its shape when an external stimulus, such as a voltage, is applied thereto. The active material could be arranged in such a manner that it causes the movement of the rear view mirror relative to the stationary support arm upon activation and/or deactivation.

Advantageously, the rear view mirror according to the invention can be made very compact due to its sandwich-like construction. Also, by moving the entire rear view mirror relative to a stationary support arm, less mechanical parts need to be utilized in the rear view mirror. The use of active material in the frame element allows moving the rear view mirror almost silently, since no mechanical transmission and/or electrical motors are used.

In one example, the active material is at least one of a shape memory alloy (SMA), a ferromagnetic shape memory alloy (FSMA), a shape memory polymer (SMP), a piezoelectric ceramic, a piezoelectric polymer, a magnetostrictor material, in particular Terfenol-D, or an electrostrictor. Preferably, the active material is a SMA material. Advantageously, SMA material changes its shape when an external stimulus is applied thereto. Here, the external stimulus could be, for example, a voltage that is applied to the SMA material.

In one example, the active material comprises a wire comprising a coating, preferably the wire comprising shape memory alloy (SMA) material, and/or the coating comprising silicone material. For example, the wire could have a circular cross-section and could be coated with a coating that surrounds and encloses the circular cross-section. However, the coating and the wire could also have a different cross-section, such as for example having a rectangular, a triangular, and/or an oval geometry. Preferably, the coating comprises silicone material. The silicone material could be flexible so that it compresses and expands with the active material. However, the coating could also comprise a graphene film, electronic paper, carbon nanotubes, etc. Advantageously, by coating the active material, the heat transfer characteristics of the active material, and hence the cycle times of the active material can be improved.

In one example, the rear view mirror further comprises a control module, wherein the control module is detachably attached to the frame element. The control module could comprise switching means for controlling the supply of a voltage to the active material. For example, when a SMA wire is used as active material, the voltage causes the SMA wire to contract, and hence causes the rear view mirror to move relative to the stationary support arm. Advantageously, the control module could be detachably plugged into corresponding means on the frame element so that it can be easily removed. Also, the control module could be connected to various sensors that are arranged in and/or on the rear view mirror.

In another example, the control module is located in an elevated position on the frame element above the active material. Here, the term "elevated" is used to describe that the control module is being held suspended above the active material, wherein the control module is kept spaced by a predetermined distance from the frame element. This predetermined distance could be a range between 1 mm and 3 cm. For example, the control module could be located above the SMA wire that causes the adjusting to move the rear view minor. Advantageously, by using such a "piggyback" arrangement, the actual weight of the control module does not cause mechanical stress to any mechanical parts, and hence does not adversely affect the process of transferring the rear view minor into the anti-glare position and back into the normal position again.

In yet another example, the control module is electrically and mechanically detachably connected to the frame element by a plug and socket connection. Advantageously, a plug and socket connection, where the control module comprises at least one pin of a plug, and the frame element comprises the corresponding socket, or vice versa, can provide sufficient stability so that the control module is firmly held on the frame element, while at the same time providing a reliable electrical connection. In addition, further clamps could be used to hold the control module on the frame element.

In another example, the rear view minor further comprises an adapter element, wherein the adapter element is detachably attached to the adjusting element, and wherein the adapter element is conFigured to connect the rear view minor to the stationary support arm. Advantageously, by using a separate element to connect the adjusting element to the stationary support arm, the rear view minor can be easily mounted onto different kinds of support arms that are used by the various car manufactures.

Also, in yet another example, the adapter element is detachably attached to the frame element by a ball joint structure.

Also, in one example, the control module is electrically connected to the inside of the car by means of a flexible contact wire that runs through the stationary support arm, preferably the flexible contact wire is a Flat Flex Cable (FPC). For example, the stationary support arm could be hollow, or could comprise an opening on that part of the stationary support arm to which the rear view minor is attached to. For example, the flexible contact wire could be an essentially flat single or multi-conductor cable made of PVC, Silicone, etc. Advantageously, the flexible contact wire greatly contributes to the compact design of the rear view mirror.

In another example, the frame element is detachably attached to the second side of the support element by means of a quick-fit connection. For example, the quick-fit connection could be any connection that allows to easily attach the two components to each other. For example, the quick-fit connection could be a connection where hooks interact with corresponding slots in the material of the opposite part to join both components together. Advantageously, by using such a connection, the reflective surface can be quickly replaced.

Alternatively, in another example, the frame element and the support element are comprised in one single element. Advantageously, by combining both components in one single element, the complexity of the rear view mirror can be even further reduced.

In yet another example, the adjusting element is adapted to move the rear view mirror between a normal position and an anti-glare position. Here, the term "normal position" is used to refer to a position of the rear view mirror in which the driver can see the scenery behind the vehicle in the rear view mirror, whereas the term "anti-glare position" is used to refer to a position where the entire rear view mirror is horizontally tilted about the stationary support arm so that glare from a following vehicle's headlamps can be greatly reduced by tilting the surface of the reflective element out of line with the driver's view. Preferably, the adjusting element is connected to the frame element by means of a hinge like bearing structure. For example, the top edge of the adjusting element could be attached to the frame element by the hinge like bearing structure so that the adjusting element can rotate or tilt relative to the adapter element. Also, mechanical springs could be used to transfer the adjusting element and thus the entire rear view mirror from the anti-glare position back into the normal position. Preferably, the adjusting element is adapted to lock the rear view mirror in either the normal position or in the anti-glare position, i.e. in the respective end positions, in particular with a tolerance of below one arcsecond. Advantageously, the rear view minor can smoothly move between the two end positions back and forth without having to overrun the end positions for locking the rear view minor. This can be realized by designing the adjusting element so that it traces a very shallow cardioid curve that makes overrunning the end positions for locking the rearview minor in either one of the end positions redundant.

In yet another example, the active material is in form of a wire having a first and a second end, and wherein the first and the second end of the wire is attached to the frame element, and the middle part of the wire is adapted to directly or indirectly actuate the adjusting element. Here, the active material that moves the rear view mirror could be in form of a wire consisting of SMA material. By applying, or not applying, a voltage to the SMA material, the wire can be made to contract, i.e. the wire can be shortened. Both ends of the wire are attached to the frame element, while the middle part which could be referred to as the part of the wire between the two ends could indirectly or indirectly actuate the adjusting element that is attached to the frame element. The tension forces applied by the wire onto the adjusting element result in a torque which causes the adjusting element to move the frame element and, thus, the remaining parts of the rear view mirror that are attached to the frame element relative to the stationary support arm in a tilting motion.

The invention also relates to a rear view mirror assembly comprising a rear view mirror according to the invention and a stationary support arm.

The invention further relates to a motor vehicle with a rear view mirror assembly according to the invention.

Various aspects of this invention will become apparent to those skilled in the art from the following detailed description of the preferred embodiment, when read in light of the accompanying drawings.

BRIEF DESCRIPTION OF THE DRAWINGS

FIG. 3 is a cross sectional view of another embodiment of a frame element comprising active material.

FIG. 4b is another perspective view of a socket connection arranged on the frame element of FIG. 4a.

FIG. 4c is a perspective view of the control module of FIG. 4a.

DETAILED DESCRIPTION OF THE PREFERRED EMBODIMENT

Figure 1:
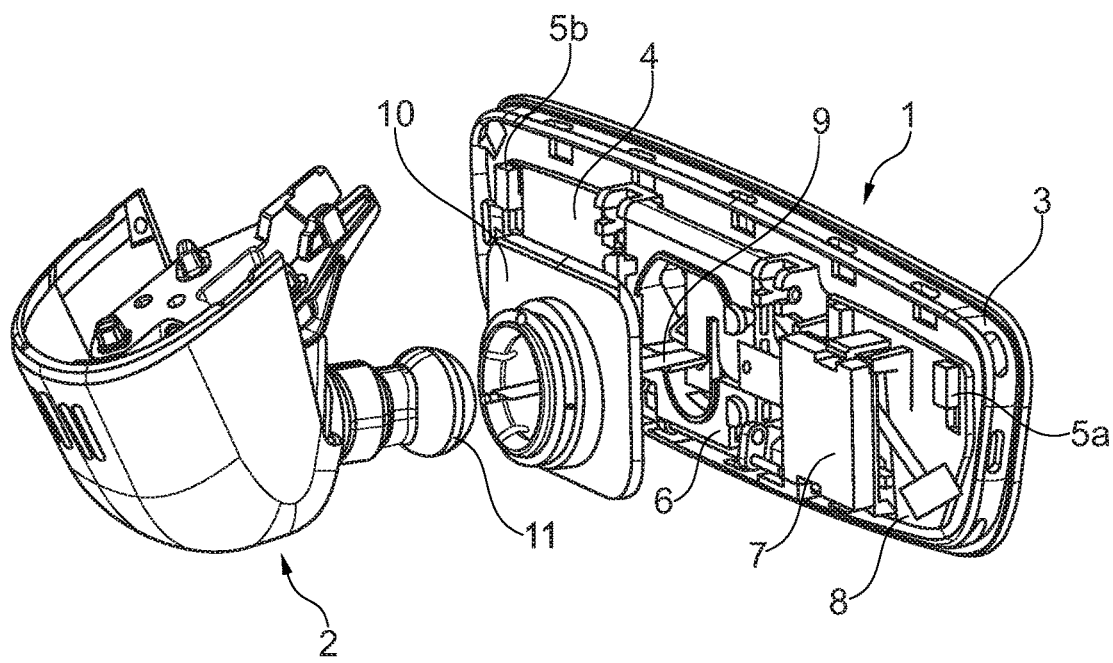
FIG. 1 is an exploded view of a rear view mirror according to an example of the invention together with a stationary support arm.

FIG. 1 illustrates a rear view mirror 1 according to an example of the invention where the rear view mirror 1 is shown together with a stationary support arm 2. In the example that is shown in FIG. 1, the second side of a support element 3 is located opposite to its first side to which a reflective element (not shown) is attached to. As shown in FIG. 1, the support element 3 is attached to a frame element 4 by means of hooks 5a, 5b that interact with corresponding slots (not shown) provided by the frame element 4. However, the skilled person would know that the support element 3 could also be attached to the frame element 4 by other quick-fit means, for example, by means of a push fit connection, or by means of an adhesive. Alternatively, the frame element 4 and the support element 3 could be comprised in one single element.

FIG. 1 also shows adjustment element 6 that is adapted to move the rear view mirror 1 relative to the stationary support arm 2. In the shown example, the adjustment element 6 has the shape of a flap that is suspendedly attached with its upper edge to the frame element 4 so that it can tilt the frame element 4 as well as the attached support element 3 into the upwards direction.

In addition, FIG. 1 shows a control module 7 that is attached to the frame element 4 by means of brackets or clamps so that it is kept spaced apart from the surface of the frame element 4. Also, FIG. 1 shows that an active material 8 preferably comprising a SMA wire is at least partly located in a gap between the frame element 4 and the control module 7. In the particular example that is shown in FIG. 1, the active material is arranged below the control module 7.

FIG. 1 further shows a flexible contact wire 9 that runs from the control module 7 through the stationary support arm 2 towards the vehicle's inside to connect the control module 7 to a main control of the vehicle and/or to a power supply. In the shown example, an adapter element 10 is used to connect the adjusting element 6 of the rear view mirror 1 to the stationary support arm 2. However, the skilled person would know that the adapter element 10 could also be formed in one part with the adjusting element 6. In the here shown example, a ball structure 11 is formed on the stationary support arm 2. The ball structure 11 is suitable to connect to a corresponding socket in the adapter element 10 for connecting the rear view mirror 1 to a not shown vehicle body via the stationary support arm 2.

Figure 2:
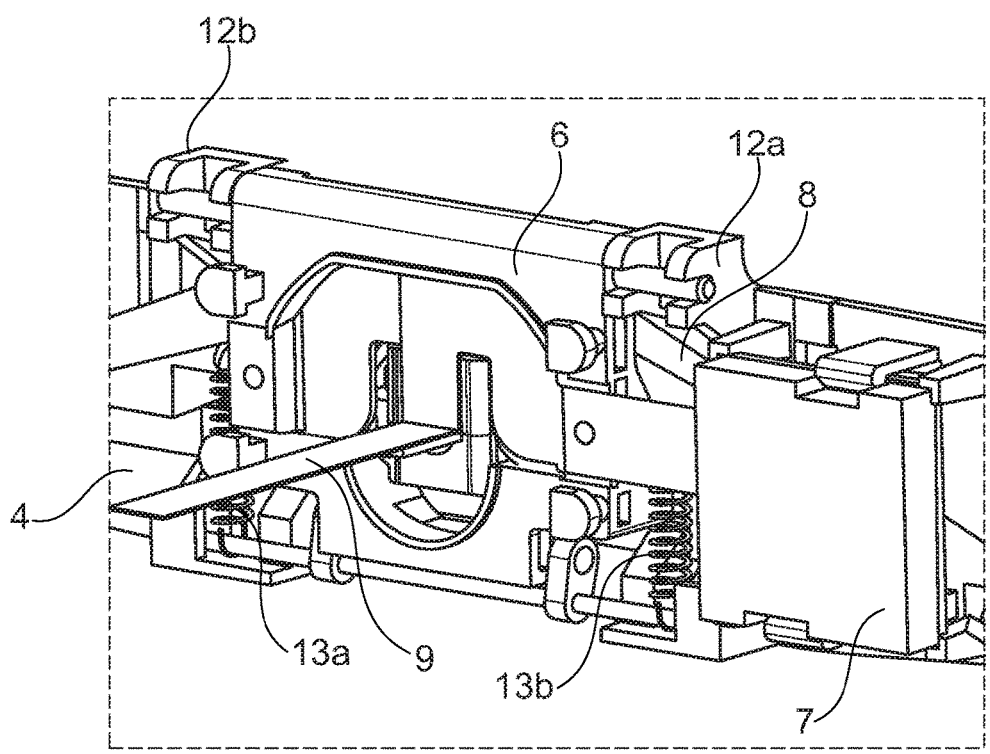
FIG. 2 is a magnified perspective view of the frame element of FIG. 1.

FIG. 2 shows a magnified view of the frame element 4, with the top edge of the adjusting element 6 being connected to the frame element 4 by means of a hinge like bearing structure 12a, 12b. The hinge like bearing structure 12a, 12b allows the adjusting element 6 to rotate or rather tilt relative to the adapter element 10. FIG. 2 also shows that springs 13a, 13b are used to transfer the adjusting element 6, and thus the entire rear view mirror 1, from an anti-glare position back into a normal position.

FIG. 3 shows a schematic view of an example of a frame element 4 comprising an active material 8. In the shown example, the active material 8 is suited to move, in fact tilt the rear view mirror 1 relative to the vehicle body that is into the anti-glare position and back to the normal position. The active material 8 comprises a wire made out of SMA material. However, the skilled person would know that the active material 8 could be also be made from some other material that is able to contract for changing its length in response to an outer stimulus, such as a voltage that is applied to the active material 8.

FIG. 3 also shows that both outer ends of the wire material 8 are attached to the frame element 4, while the middle part rests on a push rod 14. When a voltage is applied to the SMA wire, the SMA wire contracts and the resulting tension forces the push rod 14 downwards against the force of springs 13c, 13d. As can be seen from FIG. 3, the pushrod 14 comprises a protrusion 15 running along its vertical length. When the pushrod 14 is pushed down, the protrusion 15 starts to push against the adjusting element 6 (not shown in FIG. 3) so that the adjusting element 6 starts to tilt relative to the adapter element 10 to move the rear view mirror 1 relative to the stationary support arm 2. However, the skilled person would know that this is just one of several possibilities how the rear view mirror 1 can be moved. Alternatively, the active material 8 can also directly act on the adjustment element 6 for moving the rear view mirror 1. For example, a driving mechanism could be used such as the driving mechanism that is described in WO 2014/057423 that employs a shape memory alloy having a V-shaped configuration.

Figure 4A:
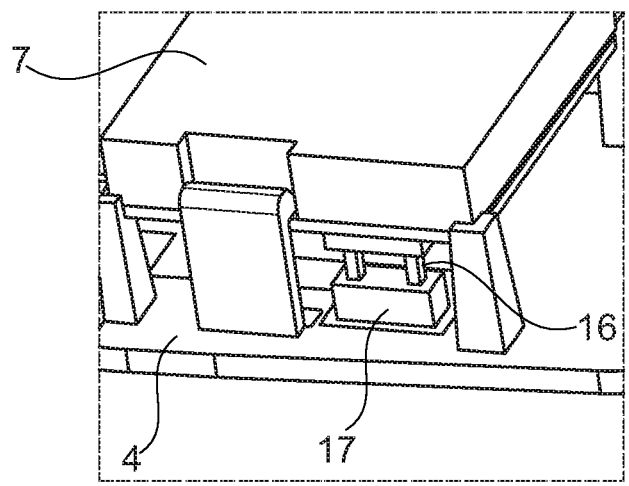
FIG. 4a is a perspective view of a control module being mounted on a frame element according to an example of the invention.
Figure 4B:
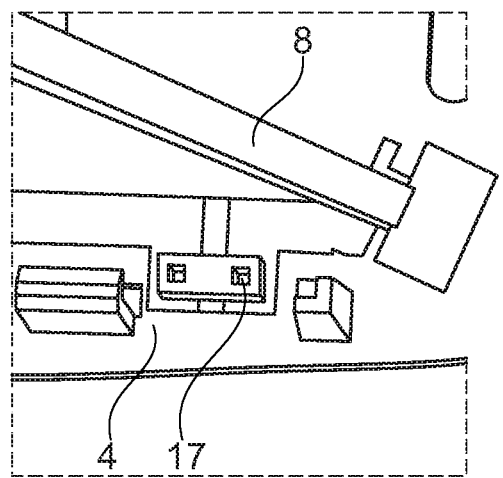
Figure 4C:
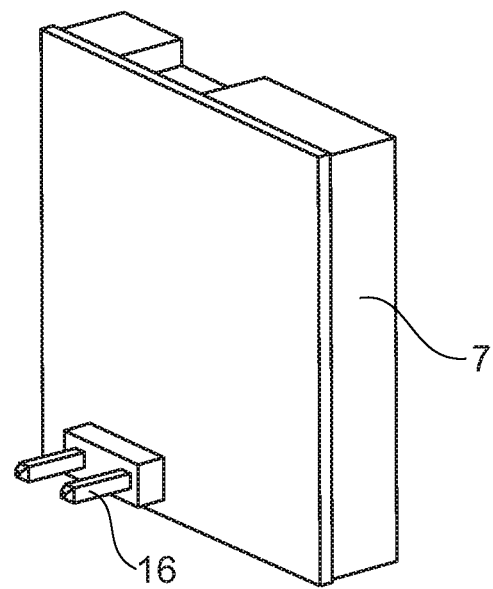

FIG. 4a shows a schematic view of a control module 7 that is mounted on a frame element 4 according to an example of the invention. In particular, it is shown that the control module 7 can be both electrically and mechanically detachably attached to the frame element 4 by a connection employing a plug 16 and a corresponding socket 17. In the shown example, additional brackets or clamps are used to connect the control module 7 to the frame element 4. However, the skilled person would know that the electrical connection itself is already sufficient to attach the control module 7 to the frame element 4. FIG. 4b shows a schematic view of the socket 17 arranged on the frame element 4 and shows the active material 8 that is arranged between the frame element 4 and the control module 7. In FIG. 4c a schematic view of the control module 7 is shown.

Figure 5:
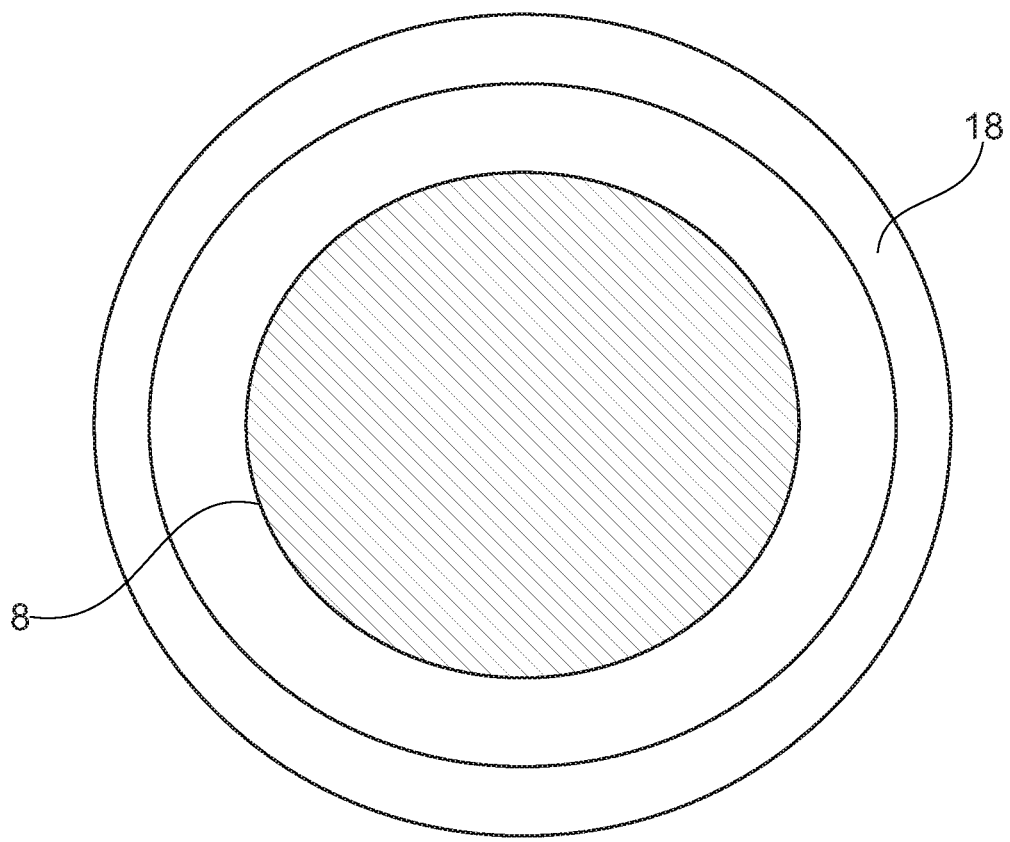
FIG. 5 is a cross sectional view of a wire comprising active material and a coating.

In FIG. 5 a cross section of a wire comprising active material and a coating is shown. In the shown example, the wire and the coating are circular. However, the skilled person would know that the wire and the applied coating could also have a different shape, such as for example having a rectangular, a triangular, and/or an oval geometry.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A rear view mirror for use in a motor vehicle, comprising:
    a support element having a reflective element attached to a first side; and
    a frame element detachably attached to a second side of the support element which is located opposite the first side, wherein the frame element comprises an adjusting element, wherein the adjusting element is adapted to connect the rear view mirror to a stationary support arm holding the rear view mirror and wherein the adjusting element is further adapted to move the rear view mirror that comprises both the support element having the reflective element and the frame element relative to the stationary support arm, and wherein the frame element comprises active material to move the rear view mirror.

2. The rear view mirror of claim 1, wherein the active material is at least one of a shape memory alloy (SMA), a ferromagnetic shape memory alloy (FSMA), a shape memory polymer (SMP), a piezoelectric ceramic, a piezoelectric polymer, a magnetostrictor material, in particular Terfenol-D, or an electrostrictor.

3. The rear view mirror of claim 1, wherein the active material comprises a wire comprising a coating, the wire comprising shape memory alloy (SMA) material, and/or with the coating comprising silicone material.

4. The rear view mirror of claim 1, further comprising a control module, wherein the control module is detachably attached to the frame element.

5. The rear view mirror of claim 1, further comprising a control module, wherein the control module is arranged in an elevated position on the frame element above the active material.

6. The rear view mirror of claim 5, wherein the control module is electrically and mechanically detachably connected to the frame element by a plug and socket connection.

7. The rear view mirror of claim 1, further comprising an adapter element, wherein the adapter element is detachably attached to the adjusting element, and wherein the adapter element is configured to connect the rear view mirror to the stationary support arm.

8. The rear view mirror of claim 7, wherein the adapter element is detachably attached to the stationary support arm by a ball joint structure.

9. The rear view mirror of claim 1, further comprising a control module, wherein the control module is electrically connected to the inside of a vehicle by a flexible contact wire configured as a Flat Flex Cable (FPC) that runs through the stationary support arm.

10. The rear view mirror of claim 1, wherein the frame element is detachably attached to the second side of the support element by means of a quick-fit connection.

11. The rear view mirror of claim 1, wherein the support element and the frame element are comprised in one single element.

12. The rear view minor of claim 11, wherein the active material is in form of a wire having a first and a second end, and wherein the first and the second end of the wire is attached to the frame element, and the middle part of the wire is adapted to directly or indirectly actuate the adjusting element.

13. The rear view mirror of claim 1, wherein the adjusting element is adapted to move the rear view mirror between a normal position and an anti-glare position, preferably the adjusting element is connected to the frame element by means of a hinge like bearing structure, and preferably the adjusting element is adapted to lock the rear view mirror in either the normal position or in the anti-glare position, in particular with a tolerance of below one arcsecond.

14. A rear view mirror assembly comprising an internal rear view mirror according to claim 1 and a stationary support arm.

15. A motor vehicle with the rear view mirror assembly of claim 14.

16. The rear view mirror of claim 1 wherein the frame element is detachably attached to the second side support by means of a quick-fit connection.

* * * * *